United States Patent
Dods et al.

(10) Patent No.: US 11,215,321 B2
(45) Date of Patent: Jan. 4, 2022

(54) COOLED LUBRICANT FILTER HOUSING

(71) Applicant: CUMMINS INC., Columbus, IN (US)

(72) Inventors: James A. Dods, Barnard Castle (GB); Paul Andrew Leggott, Darlington (GB)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/647,836

(22) PCT Filed: Oct. 26, 2018

(86) PCT No.: PCT/US2018/057678
§ 371 (c)(1),
(2) Date: Mar. 16, 2020

(87) PCT Pub. No.: WO2019/084379
PCT Pub. Date: May 2, 2019

(65) Prior Publication Data
US 2020/0278083 A1    Sep. 3, 2020

Related U.S. Application Data

(60) Provisional application No. 62/577,315, filed on Oct. 26, 2017.

(51) Int. Cl.
*B01D 35/30* (2006.01)
*F16N 39/02* (2006.01)
(Continued)

(52) U.S. Cl.
CPC ............ *F16N 39/02* (2013.01); *B01D 35/005* (2013.01); *B01D 35/147* (2013.01); *B01D 35/18* (2013.01);
(Continued)

(58) Field of Classification Search
CPC .... B01D 35/005; B01D 35/147; B01D 35/18; B01D 35/30; F16N 39/02; F16N 39/06;
(Continued)

(56) References Cited

U.S. PATENT DOCUMENTS 4,426,965 A    1/1984  Patel
4,742,866 A    5/1988  Yamanaka et al.
(Continued)

FOREIGN PATENT DOCUMENTS

CN    1988945      6/2007
CN    103727709    4/2014
(Continued)

OTHER PUBLICATIONS

International Search Report from corresponding PCT Application No. PCT/US2018/057678, dated Jan. 11, 2019, pp. 1-2.
(Continued)

*Primary Examiner* — Waqaas Ali
(74) *Attorney, Agent, or Firm* — Foley & Lardner LLP

(57) ABSTRACT

A lubricant filter housing comprises a top plate defining a first opening. A base plate is positioned opposite the top plate. The lubricant filter housing further comprises at least one sidewall which cooperatively with the top plate and the base plate defines an internal volume. A plurality of plates are axially positioned in the internal volume between the top plate and the base plate. Each plate defines a plate opening axially aligned with the first opening which cooperatively with the first opening and a portion of the base plate, defines an internal cavity for housing a filter element. The plates define a first set of fluid channels structured to deliver a lubricant to the internal cavity, and a second set of fluid channels structured to provide a coolant around the first set of fluid channels.

16 Claims, 5 Drawing Sheets

(51) Int. Cl.
  *B01D 35/00*   (2006.01)
  *B01D 35/147*  (2006.01)
  *B01D 35/18*   (2006.01)
  *F16N 39/06*   (2006.01)
  *F28F 3/08*    (2006.01)
  *F01M 5/00*    (2006.01)
  *F01M 11/03*   (2006.01)

(52) U.S. Cl.
  CPC .............. *B01D 35/30* (2013.01); *F16N 39/06* (2013.01); *F28F 3/08* (2013.01); *F01M 5/002* (2013.01); *F01M 11/03* (2013.01)

(58) Field of Classification Search
  CPC . F28F 3/08; F28F 19/01; F01M 5/002; F01M 11/03; F28D 9/005; F28D 9/0056; F28D 2021/0089
  See application file for complete search history.

(56) References Cited

U.S. PATENT DOCUMENTS

| | | |
|---|---|---|
| 4,892,136 A | 1/1990 | Ichihara et al. |
| 5,016,579 A | 5/1991 | Suzuki et al. |
| 5,351,664 A | 10/1994 | Rotter et al. |
| 5,363,823 A | 11/1994 | Gittlein |
| 5,558,154 A | 9/1996 | Lefeber |
| 5,685,368 A | 11/1997 | Yuasa et al. |
| 6,085,832 A | 7/2000 | Rehberg |
| 6,263,960 B1 | 7/2001 | Yamanaka et al. |
| 6,422,305 B2 | 7/2002 | Jainek |
| 6,446,712 B1 | 9/2002 | Wu et al. |
| 6,497,274 B2 | 12/2002 | Cheadle |
| 7,261,080 B2 | 8/2007 | Chonan et al. |
| 7,543,711 B1 * | 6/2009 | Stamey, Jr. .......... B01D 35/147 210/130 |
| 2009/0159249 A1 | 6/2009 | Pustelnik et al. |

FOREIGN PATENT DOCUMENTS

| | | |
|---|---|---|
| CN | 105545404 | 5/2016 |
| DE | 43 22 979 A1 | 1/1995 |
| EP | 1 493 903 A1 | 1/2005 |
| EP | 2 255 862 | 12/2010 |
| FR | 2908816 | 11/2006 |
| WO | WO-03/085240 | 10/2003 |

OTHER PUBLICATIONS

Written Opinion from corresponding PCT Application No. PCT/US2018/057678, dated Jan. 11, 2019, pp. 1-6.
Office Action for CN Application No. 201880066898.9, dated Dec. 3, 2020.
Supplementary European Search Report for EP Patent Application No. 18869619.9, dated Jul. 5, 2021.

* cited by examiner

COOLED LUBRICANT FILTER HOUSING

CROSS-REFERENCE TO RELATED PATENT APPLICATIONS

The present application is the U.S. national phase of PCT Application No. PCT/US2018/057678, filed Oct. 26, 2018, which claims priority to and the benefit of U.S. Provisional Application No. 62/577,315, filed Oct. 26, 2017 and entitled "Cooled Lubricant Filter Housing," the disclosures of which are hereby incorporated herein by reference in their entireties.

TECHNICAL FIELD

The present disclosure relates generally to housings for lubricant filters for use with internal combustion engine systems.

BACKGROUND

Internal combustion engines generally use a lubricant such as an engine oil to lubricate various parts of the engine. The lubricant is generally circulated to the various parts of the system in a closed loop system. Over a period of time, the lubricant may become contaminated with particulate matter such as carbon, organic and inorganic particles produced by lubricant degradation, metal shavings, etc. This particulate matter can damage the various parts of the engine if delivered thereto with the lubricant, and therefore needs to be removed before the lubricant is recirculated. The lubricant is generally passed through a filter element structured to remove the particulate matter from the lubricant, prior to delivering the lubricant to the various engine parts. As the lubricant recirculates through the engine, it can become heated. The heated lubricant may damage the filter element, as well as increase parasitic power losses from the engine. While lubricant coolers may be used to cool the lubricant before communicating the lubricant to the filter, such lubricant coolers generally include separate cooling assemblies mounted on or near a housing containing the filter element. This increases the space requirement for mounting the lubricant cooler, complicates packaging and increases assembly costs.

SUMMARY

Embodiments described herein relate generally to housings for mounting a filter element, and in particular to a lubricant filter housing that defines an internal cavity for accepting and housing the filter element. A plurality of plates are positioned in an internal volume defined by the housing. The plurality of plates define a first set of fluid channels structured to deliver a lubricant to the filter element, and a second set of fluid channels structured to communicate a coolant around the first set of fluid channels so as to cool the lubricant flowing therewithin.

In a set of embodiments, a lubricant filter housing comprises a top plate which defines a first opening therein. A base plate is positioned opposite the top plate. The base plate defines a lubricant outlet distal to the first opening and axially aligned therewith. The lubricant filter housing also comprises at least one sidewall such that the at least one sidewall, the top plate, and the base plate cooperatively define an internal volume. A plurality of plates are axially positioned in the internal volume between the top plate and the base plate. Each of the plurality of plates define a plate opening axially aligned with the first opening such that the first opening, the plate openings and a portion of the base plate cooperatively define an internal cavity structured to accept and house a filter element. The plurality of plates define a first set of fluid channels and a second set of fluid channels therebetween. The first set of fluid channels are interposed between the second set of fluid channels. The first set of fluid channels are in fluid communication with the internal cavity and fluidly isolated from the second set of fluid channels, and the second set of fluid channels are fluidly isolated from the first set of fluid channels and the internal cavity.

In another set of embodiments, a filter assembly, comprises a lubricant filter housing, comprising a top plate, the top plate defining a first opening therein; a base plate positioned opposite the top plate; at least one sidewall, the at least one sidewall, the top plate, and the base plate cooperatively defining an internal volume; and a plurality of plates axially positioned in the internal volume between the top plate and the base plate. Each of the plurality of plates defines a plate opening axially aligned with the first opening such that the first opening, the plate openings and a portion of the base plate cooperatively define an internal cavity. The plurality of plates defining a first set of fluid channels and a second set of fluid channels therebetween, the first set of fluid channels interposed between the second set of fluid channels, the first set of fluid channels in fluid communication with the internal cavity and fluidly isolated from the second set of fluid channels, and the second set of fluid channels fluidly isolated from the first set of fluid channels and the internal cavity. A filter element is positioned in the internal volume.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
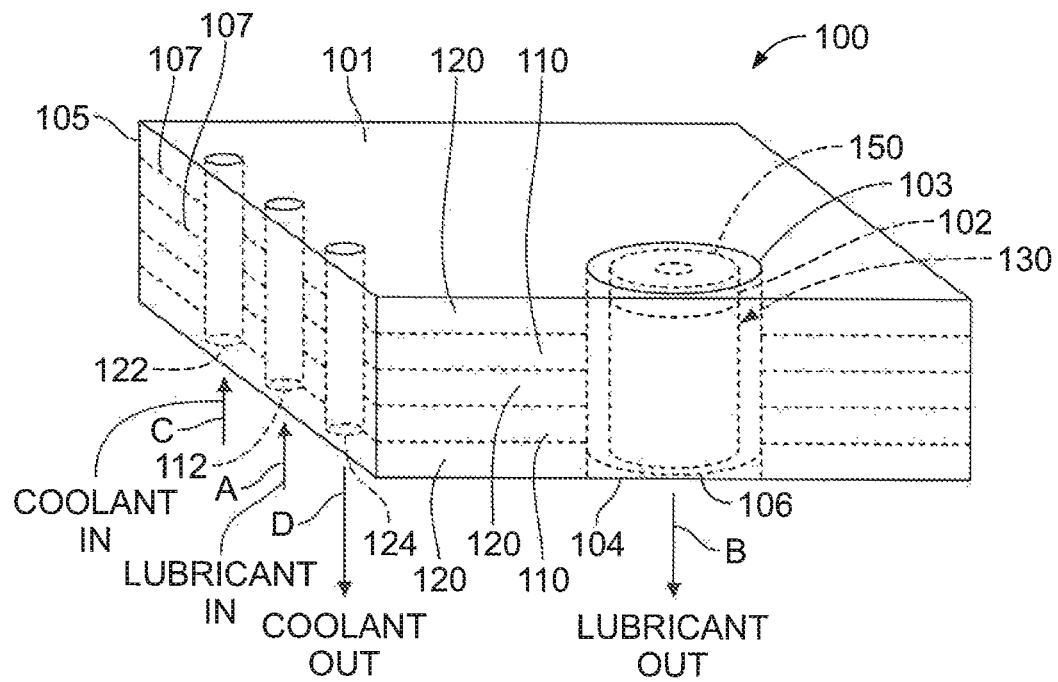
FIG. 1 is a top perspective view of a lubricant filter housing, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to housings for mounting a filter element, and in particular to a lubricant filter housing that defines an internal cavity for accepting and housing the filter element. A plurality of plates are positioned in an internal volume defined by the housing. The plurality of plates define a first set of fluid channels structured to deliver a lubricant to the filter element, and a second set of fluid channels structured to communicate a coolant around the first set of fluid channels so as to cool the lubricant flowing therewithin.

Internal combustion engines generally use a lubricant such as an engine oil to lubricate various parts of the engine. The lubricant is generally circulated to the various parts of the system in a closed loop system. Over a period of time, the lubricant may become contaminated with particulate matter such as carbon, organic and inorganic particles produced by lubricant degradation, metal shavings, etc. This particulate matter can damage the various parts of the engine if delivered thereto with the lubricant, and therefore needs to be removed before the lubricant is recirculated. The lubricant is typically passed through a filter element structured to remove the particulate matter from the lubricant, prior to delivering the lubricant to the various engine parts. As the lubricant recirculates through the engine, it can become heated. The heated lubricant may damage the filter element, as well as increase parasitic power losses from the engine. While lubricant coolers may be used to cool the lubricant before communicating the lubricant to the filter, such lubricant coolers generally include separate cooling assemblies mounted on or near a housing containing the filter element. This increases the space requirement for mounting the lubricant cooler, complicates packaging and increases assembly costs.

Embodiments described herein provide for a lubricant filter housing including a plurality of plates positioned within an internal volume defined by the housing. The plurality of plates define a plate opening which in cooperation with a first opening defined in a top plate of the lubricant filter housing and a base plate of the lubricant filter housing, define an internal cavity for receiving and accepting a filter element. Furthermore, the plurality of plates define a first set of fluid channels therebetween structured to communicate a lubricant (e.g., engine oil) to the filter element housed within the internal cavity. The plurality of plates also define a second set of fluid channels such that the first set of fluid channels are interposed between the second set of fluid channels. The second set of fluid channels are fluidly isolated from the first set of fluid channels and the internal cavity. The second set of fluid channels are structured to receive a coolant which cools the lubricant flowing through the first set of fluid channels interposed between the second set of fluid channels.

Embodiments described herein provide several benefits including, for example: (1) integrating a filter element housing and lubricant cooling features within an integrated lubricant filter housing thereby reducing space constraints and improving packaging; (2) reducing the number of parts required for housing the filter element and cooling the oil, thereby reducing assembly time and manufacturing costs which may also lead to improve service intervals; and (3) reducing parasitic power loss from the engine by reducing plumbing requirements and providing a shorter path for communicating the lubricant to the filter element, which may reduce lubricant pumping power requirements.

FIG. 1 is a top perspective view of a lubricant filter housing 100 according to an embodiment. The lubricant filter housing 100 comprises a top plate 101, a base plate 104 positioned opposite the top plate 101, and at least one sidewall 105. The top plate 101, the base plate 104 and the at least one sidewall 105 cooperatively define an internal volume. Each of the top plate 101, the base plate 104 and the at least one sidewall 105 may be formed from any suitable material such as, for example, metals (e.g., aluminum, stainless steel, alloys, etc.), polymers, plastics or any other suitable material or a combination thereof.

Figure 2:
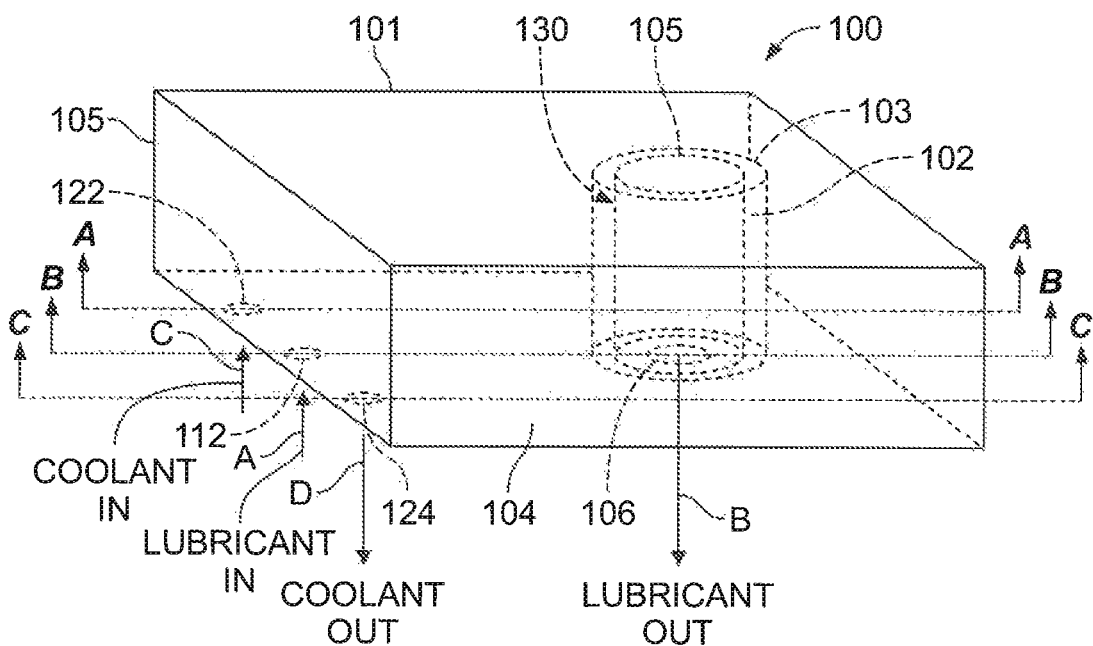
FIG. 2 is a bottom perspective view of the lubricant filter housing of FIG. 1.

The top plate 101 defines a first opening 103 therein. The first opening 103 may be sized and shaped to allow insertion of a filter element 130 therethrough into an internal cavity 102 defined in the lubricant filter housing 100, as described in further detail below herein. While FIGS. 1 and 2 show the first opening 103 having a generally circular shape, this is only for illustrative purposes. It should be understood that the first opening 103 may have any suitable shape (e.g., circular, square, rectangular, polygonal, etc.) corresponding to the shape and size of the filter element 130 inserted therethrough.

The lubricant filter housing 100 may also include a cover 150. At least a portion of the cover 150 is structured to be positioned securely within the first opening 103. For example the first opening 103 and/or at least the portion of the cover 150 may include a securing mechanism, for example mating threads, a snap fit mechanism, a locking mechanism, a friction fit, or any other suitable securing mechanism structured to secure at least the portion of the cover 150 within the first opening 103.

In particular embodiments, the lubricant filter housing 100 may also comprise a first opening flange (e.g., the first opening flange 211 described below herein) extending from a rim of the first opening 103 away from the internal cavity 102. The first opening flange may be structured to engage and secure at least the portion of the cover 150.

Figure 3:
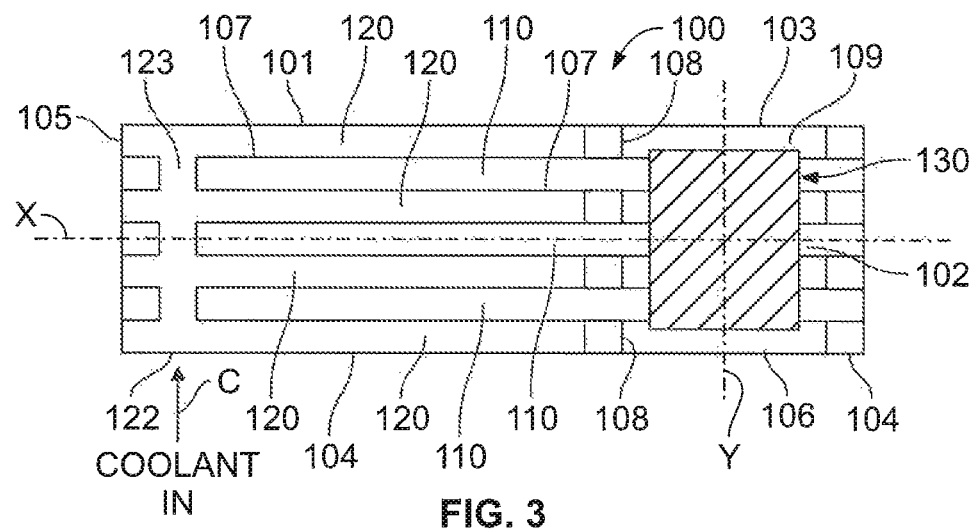
FIG. 3 is a side cross-section view of the lubricant filter housing of FIG. 1 taken along the line A-A shown in shown in FIG. 2.
Figure 4:
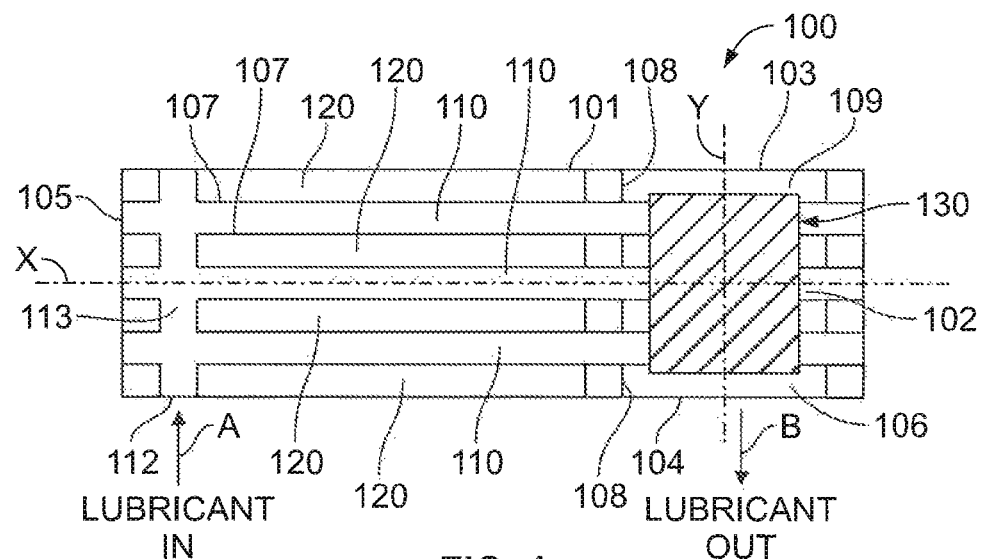
FIG. 4 is a side cross-section view of the lubricant filter housing of FIG. 1 taken along the line B-B shown in FIG. 2.
Figure 5:
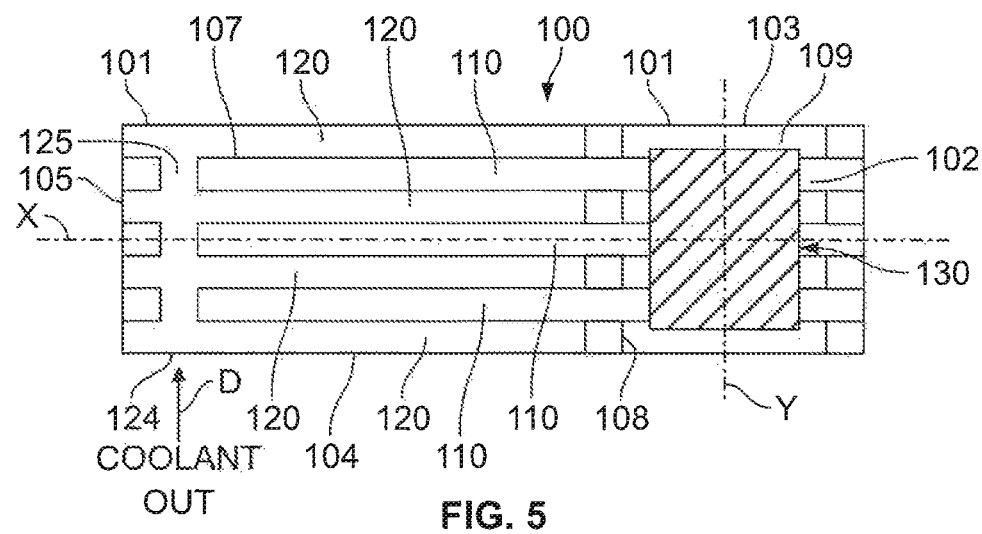
FIG. 5 is a side cross-section view of the lubricant filter housing of FIG. 1 taken along the line C-C shown in FIG. 2.

FIG. 2 is a bottom perspective view of lubricant filter housing 100. FIGS. 3, 4 and 5 are side cross-section views of the lubricant filter housing 100 taken along the lines A-A, B-B and C-C respectively, as shown in FIG. 2. The base plate 104 defines a lubricant outlet 106 therein. The lubricant outlet 106 is positioned distal to the first opening 103 and axially aligned therewith along the axis Y-Y as shown in FIG. 4. The lubricant outlet 106 is structured to allow a filtered lubricant (e.g., engine oil such as SAE 0W-30, SAE 5W-30, SAE 10W-30, SAE 5W-40, SAE 10W-40, SAE 15W-40, natural engine oil, synthetic engine oil, semi-synthetic engine oil, or any other suitable engine oil), to be communicated out of the internal cavity 102.

The base plate 104 also defines a lubricant inlet 112, a coolant inlet 122 and a coolant outlet 124 (see FIGS. 2-4). The lubricant inlet 112 is structured to allow delivery of the lubricant to the internal cavity 102, as described in further detail herein. Furthermore, the coolant inlet 122 is structured to allow delivery of a coolant, and the coolant outlet 124 is structured to allow exiting of a coolant from internal volume of the lubricant filter housing 100 respectively, as described in further detail herein. It should be appreciated that, while FIGS. 1-5 show a particular orientation and location of the lubricant inlet 112, the coolant inlet 122, the coolant outlet 124, and the lubricant outlet 106, this is only for illustration purposes, and any suitable location and/or orientation thereof should be considered to be within the scope of the present application. Furthermore, while not shown, any number of pipes, tubes, or conduits may be fluidly coupled to the lubricant inlet 112, the lubricant outlet 106, the coolant inlet 122 and the coolant outlet 124 to allow for communication of the lubricant and coolant, respectively to or from the lubricant filter housing 100.

The coolant may include any suitable heat transfer fluid which may be used to cool the lubricant flowing through the lubrication filter housing 100 as described herein. Such coolants may include but are not limited to water, ethylene glycol, diethylene glycol, propylene glycol, silicone oils or any other coolant or a combination thereof.

A plurality of plates 107 are axially positioned within the internal volume of the lubricant filter housing 100 between the top plate 101 and the base plate 104. Expanding further, the plurality of plates 107 are aligned along the axis X-X of the lubricant filter housing 100 as shown in FIGS. 3-5. In some embodiments, each of the plurality of plates 107 may be substantially planar and positioned parallel to the top plate 101 and the base plate 104.

The plurality of plates 107 can be made from any suitable material having a high rate of heat transfer such as, for example, metals (e.g., aluminum, stainless steel, alloys, etc.), or any other suitable material or a combination thereof. The plurality of plates 107 may be composed of the same material or a different material from the top plate 101, the base plate 104 and the sidewall 105. In some embodiments, the top plate 101, the base plate 104, the sidewall 105 and the plurality of plates 107 may be manufactured separately and then coupled together (e.g., via welding, bolts, rivets, adhesives, etc.) so as to form the lubricant filter housing 100. In other embodiments, the lubricant filter housing 100 may be formed monolithically, for example, via a 3-D printed process.

Each of the plurality of plates 107 defines a plate opening 109 therein (see FIGS. 3-5). Each of the plate openings 109 are axially aligned with the first opening 103 of the top plate 101 such that the first opening 103, the plate openings 109 and a portion of the base plate 104 cooperatively define an internal cavity 102 structured to accept and house the filter element 130. In some embodiments the plate openings 109 may have a plate opening cross-section which is substantially similar to a first opening cross-section of the first opening 103. In other embodiments, the plate opening cross-section may be different from the first opening cross-section, for example smaller or larger therefrom.

The filter element 130 may comprise any suitable filter element (e.g., the filter element 230 as described in further detail below herein) and comprises a filter media to filter the lubricant delivered to the internal cavity 102. The lubricant outlet 106 is positioned such that when the filter element 130 is positioned within the internal cavity 102, the filtered lubricant passing through the filter media is delivered to the lubricant outlet 106, allowing the filtered lubricant to exit the internal cavity 102 in a direction shown by the arrow B (see FIGS. 1 and 4).

The filter element 130 may be removably positioned in the internal cavity 102. For example, the cover 150 may be disengaged from the first opening 103 so as to allow access to, and removal of the filter element 130 (e.g., a used filter element) from the internal cavity 102. A replacement filter element 130 may then be positioned in the internal cavity 102, and the cover 150 repositioned on the first opening 103 so as to secure the filter element 130 within the internal cavity 102. In particular embodiments, the cover 150 may include projections, protrusions, flanges, or any other suitable features structured to engage at least a portion of the filter element 130 so as to secure the filter element 130 within the internal cavity 102. In other embodiments, the cover 150 may be incorporated into the filter element 130. For example, the cover 150 could be coupled to a first end cap 231 of the filter element 130 (e.g., the first end cap 231 of the filter element 230, described below herein), or the first end cap 231 could be formed to also serve as the cover 150.

In some embodiments, the lubricant filter housing 100 may include features to facilitate insertion and positioning of the filter element 130 into the internal cavity 102. For example, the lubricant filter housing 100 may comprise a flange (e.g., the flange 215 as described below herein with reference to FIGS. 6-10) protruding from a rim of the lubricant outlet 106 into the internal cavity 102. The flange may be structured to receive a portion of the filter element 130 therearound so as to facilitate positioning of the filter element 130 into the internal cavity 102.

The plurality of plates 107 define a first set of fluid channels 110, and a second set of fluid channels 120 therebetween, as shown in the side cross-section views of FIGS. 3-5. The first set of fluid channels 110 are interposed between the second set of fluid channels 120. In other words, each of the first set of fluid channels 110 is positioned between a pair of the second set of fluid channels 110.

The first set of fluid channels 110 are in fluid communication with the internal cavity 102 and fluidly isolated from the second set of fluid channels 120. The first set of fluid channels 110 are configured to deliver the lubricant (e.g., unfiltered or contaminated lubricant) to the internal cavity 102 so as to communicate the lubricant to the filter element 130 positioned therewithin.

In particular embodiments, each of the plurality of plates 107 further defines a lubricant inlet aperture 113 axially aligned with the lubricant inlet 112 defined in the base plate 104. The lubricant inlet aperture 113 is structured to allow delivery of the lubricant from the lubricant inlet 112 to the internal cavity 102 via the first set of fluid channels 110. A lubricant pump (not shown) such as, for example a positive displacement pump, a rotary pump, etc. may be positioned upstream of the lubricant inlet 112 and in fluid communication therewith (e.g., via a conduit, a tube, a pipe, etc.) so as to pump the lubricant into the first set of fluid channels 110 via the lubricant inlet apertures 113. In other embodiments, the lubricant pump (e.g., a positive displacement pump or a vacuum pump) may be positioned downstream of the lubricant outlet 106, and configured to draw filtered lubricant out of the lubricant outlet 106. The lubricant pump may be included in a lubricant circulation assembly configured to circulate the lubricant through the various parts of the engine and lubricant filter housing 100.

Since the first set of fluid channels 110 are fluidly isolated from the second set of fluid channels 120, the lubricant flows only into the first set of fluid channels 110 from the lubricant inlet 112, and therefrom into the internal cavity 102. For example, the portions of each of the second set of fluid channels 120 proximal to the lubricant inlet 112 and the plate openings 109 may be fluidly isolated therefrom via a seal 108 (e.g., an end wall, a seal, a weld, a braze, etc.).

Each of the plurality of plates 107 also defines a coolant inlet aperture 123 and a coolant outlet aperture 125. The coolant inlet aperture 123 is axially aligned with the coolant inlet 122 and structured to allow delivery of the coolant to the second set of fluid channels 120 from the coolant inlet 122, so as to cool the lubricant flowing through the first set of fluid channels 110. Moreover, the coolant outlet aperture 125 is axially aligned with the coolant outlet 124 and structured to deliver the coolant from the second set of fluid channels 120 to the coolant outlet 124 so that the coolant may exit therefrom.

In some embodiments, a coolant pump (not shown) may be positioned upstream of the coolant inlet 122 and in fluid communication therewith (e.g., via a conduit, a tube, a pipe, etc.) so as to pump the coolant into the second set of fluid channels 120. In other embodiments, the coolant pump may be positioned downstream of the coolant outlet 124 and configured to draw the coolant out of the coolant outlet 124 via each of the coolant outlet apertures 125. The coolant pump may be included in a coolant circulation assembly. In particular embodiments, it may be beneficial to position the coolant pump downstream of the coolant outlet 124 and draw coolant therefrom. This may prevent excessive positive pressure from developing in the second set of fluid channels 120, which may occur if a positive pressure coolant pump is employed upstream of the coolant inlet 122.

In particular embodiments, at least a portion of the first set of fluid channels 110 and the second set of fluid channels 120 is positioned concentrically around the internal cavity 102. Expanding further, each of the plate openings 109 may be defined at a location in each of the plurality if plates 107 such that a first portion of each the first set of fluid channels 110 and the second set of fluid channels 120 is substantially planar, and a second portion of each of the first set of fluid channels 110 and the second set of fluid channels 120 loops around the internal cavity 102. The second portion of the first set of fluid channels 110 and the second set of fluid channels 120 may allow the coolant and the lubricant to exchange heat through the plurality of plates 107 for a longer period of time by providing a circuitous flow path, thereby increasing cooling efficiency.

In some embodiments, fluid guides may be positioned on each of the plurality of plates 107 in order to facilitate delivery of the coolant and lubricant to the second portion of the first set of fluid channels 110 and the second set of fluid channels 120 positioned concentrically around the internal cavity 102. Such fluid guides may include, but are not limited to vanes, channels, protrusions, internal sidewalls, etc.

In operation, the lubricant, which may be heated due to circulating in an engine, is delivered to the first set of fluid channels 110, for example via the lubricant inlet 112. The coolant is delivered to the second set of fluid channels 120 via the coolant inlet 122. As the coolant moves through the second set of fluid channels 120 towards the coolant outlet 124, it exchanges heat with the lubricant flowing in the first set of fluid channels 110 through the plurality of plates 107, thereby cooling the lubricant. In this manner, cooled lubricant is delivered to the internal cavity 102 through the first set of fluid channels 110, where it is filtered by the filter element 130.

Figure 6:
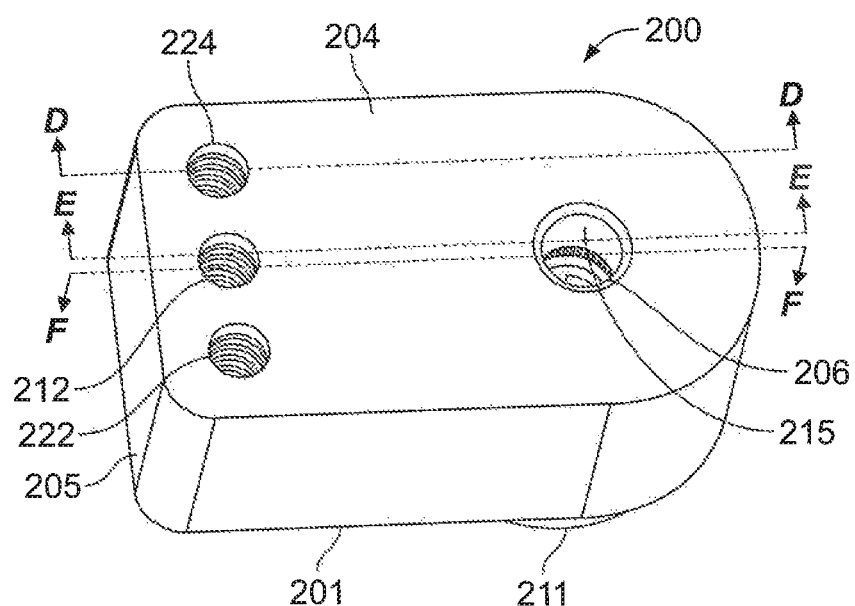
FIG. 6 is a bottom perspective view of a lubricant filter housing, according to another embodiment.
Figure 7:
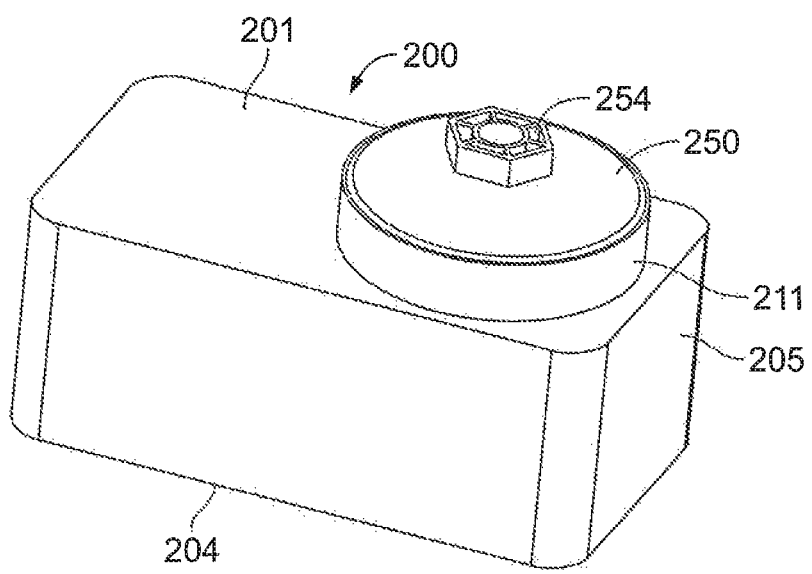
FIG. 7 is a top perspective view of the lubricant filter housing of FIG. 6.

FIG. 6 is a bottom perspective view and FIG. 7 is a top perspective view of a lubricant filter housing 200, according to another embodiment. The lubricant filter housing 200 comprises a top plate 201, a base plate 204 positioned opposite the top plate 201, and at least one sidewall 205. The top plate 201, the base plate 204 and the at least one sidewall 205 cooperatively define an internal volume. Each of the top plate 201, the base plate 204 and the at least one sidewall 205 may be formed from any suitable material such as, for example, metals (e.g., aluminum, stainless steel, alloys, etc.), polymers, plastics or any other suitable material or a combination thereof.

Figure 8:
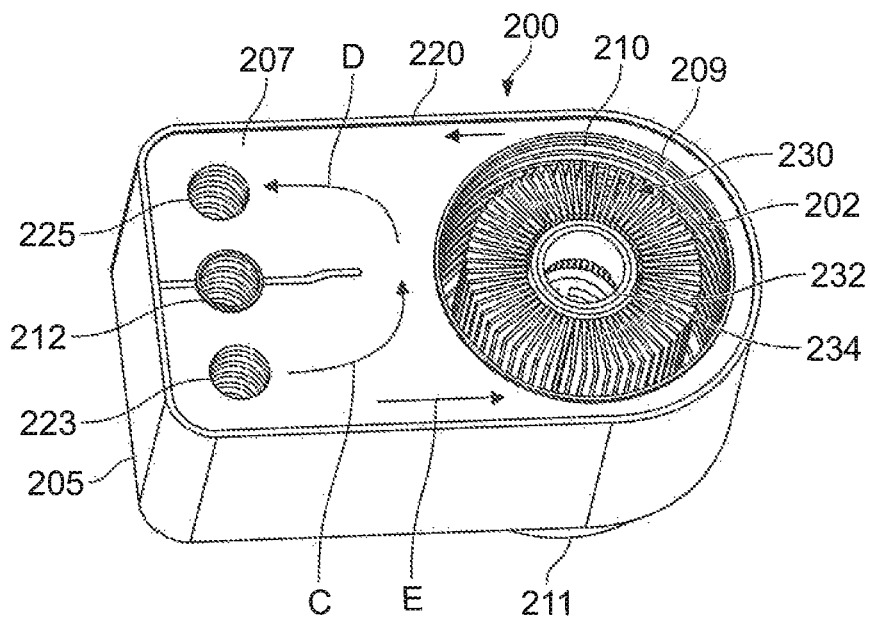
FIG. 8 is a bottom cross-section view of the lubricant filter housing of FIG. 6 taken along the line D-D shown in FIG. 6.
Figure 9:
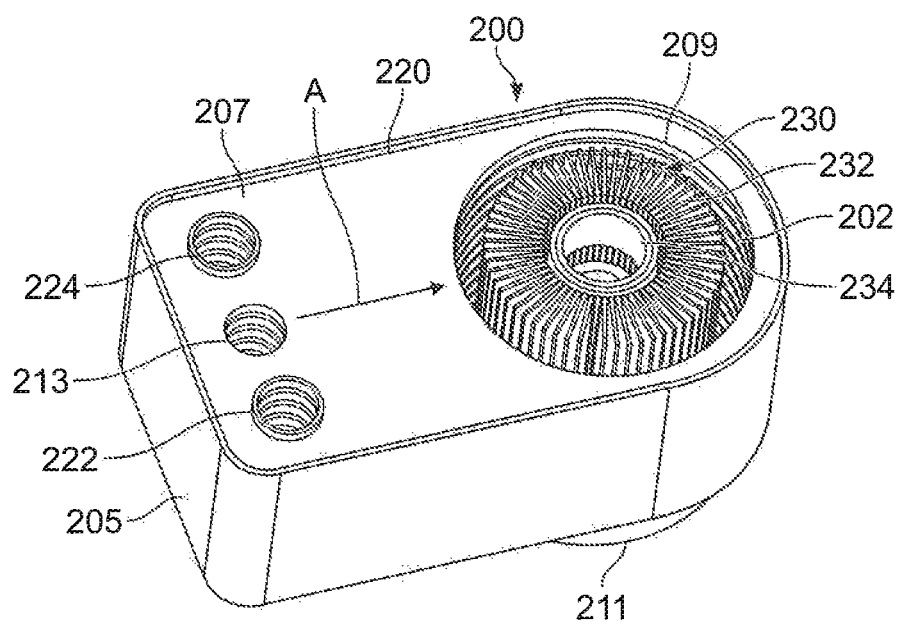
FIG. 9 is a bottom cross-section view of the lubricant filter housing of FIG. 6 taken along the line E-E shown in FIG. 6.
Figure 10:
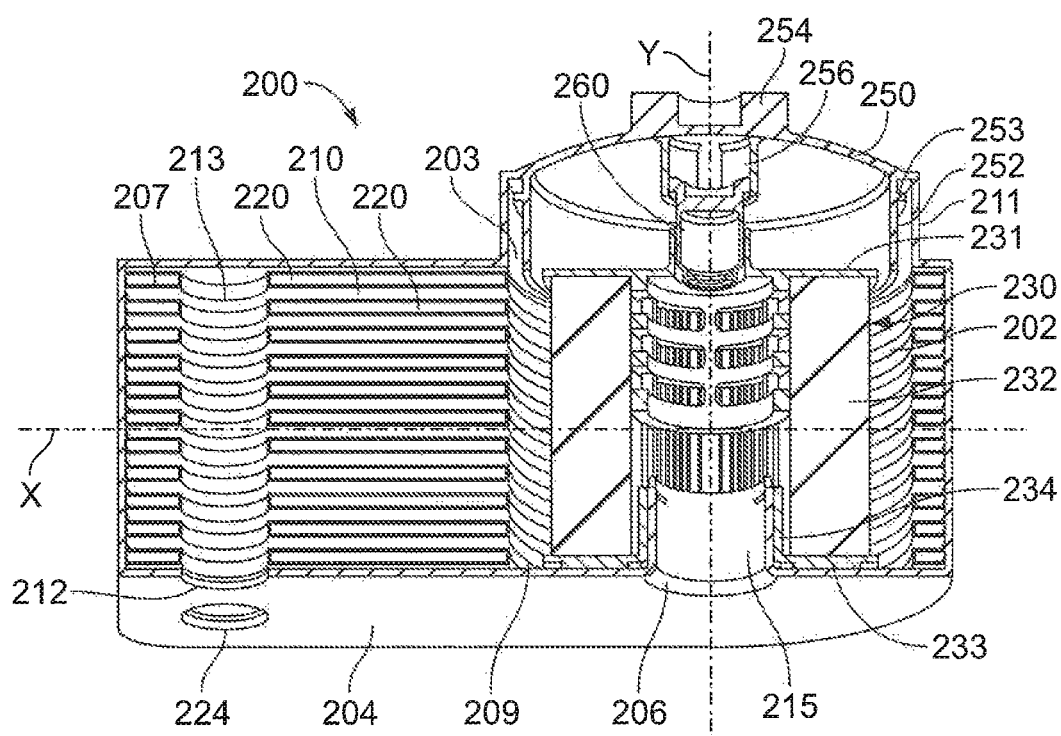
FIG. 10 is a side cross-section view of the lubricant filter housing of FIG. 6 taken along the line F-F shown in FIG. 6.

FIGS. 8 and 9 are bottom cross-section views of the lubricant filter housing 200 taken along the lines D-D and E-E, respectively as shown in FIG. 6. FIG. 10 is a side cross-section view of the lubricant filter housing 200 taken along the line F-F as shown in FIG. 6. As shown in FIG. 10, the top plate 201 defines a first opening 203 therein. The first opening 203 may be sized and shaped to allow insertion of a filter element 230 therethrough into an internal cavity 202 defined in the lubricant filter housing 200, as described in further detail below herein. The first opening 203 may have a cross-section corresponding to the shape and size of the filter element 230 inserted therethrough.

The lubricant filter housing 200 further comprises a first opening flange 211 extending from a rim of the first opening 203 away from the internal cavity 202. The lubricant filter housing 200 also includes a cover 250. The first opening flange 211 is structured to engage and secure at least a portion of the cover 250. For example, as shown in FIG. 10, the cover 250 includes a cover sidewall 252 structured to be positioned securely within the first opening flange 211.

The first opening 203 and/or the cover sidewall 252 of the cover 250 may include a securing mechanism so as to secure the cover 250 within the first opening flange 211. For example, the cover sidewall 252 may define a plurality of threads 253 on an outer surface thereof configured to be removably engaged with mating threads defined on an inner surface of the first opening flange 211. In other embodiments, the cover sidewall 252 and the first opening flange 211 may include any other suitable securing mechanism (e.g., a snap fit mechanism, a locking mechanism, a friction fit, etc.) to secure the cover sidewall 252 to the first opening flange 211.

The cover 250 may also include an engagement mechanism 254 structured to allow coupling and uncoupling of the cover 250 from the first opening flange 211. While FIG. 7 shows the engagement mechanism 254 as including a male nut defined on an outer surface of the cover 250, any suitable engagement mechanism may be used. These include but are not limited to handles, groves, indents, detents or any other suitable engagement mechanism.

In particular embodiments, the lubricant filter housing 200 may also comprise a filter bypass valve 260. In such embodiments, the cover 250 may include a receptacle 256 extending from an inner surface of the cover 250 towards the internal cavity 202 which structured to house at least a portion of the filter bypass valve 260. The filter bypass valve 260 may be selectively engaged to allow the lubricant to bypass the filter element 230, for example if the lubricant is substantially free of contaminants and does not need to be filtered, and/or the lubricant has a temperature below a temperature threshold which may render the lubricant unsuitable for cooling in the lubricant filter housing 200.

The base plate 204 defines a lubricant outlet 206 therein. The lubricant outlet 206 is positioned distal to the first opening 203 and axially aligned therewith along the axis Y-Y shown in FIG. 10. The lubricant outlet 206 is structured to allow a filtered lubricant (e.g., engine oil such as SAE 0W-30, SAE 5W-30, SAE 10W-30, SAE 5W-40, SAE 10W-40, SAE 15W-40, natural engine oil, synthetic engine oil, semi-synthetic engine oil, or any other suitable engine oil), to be communicated out of the internal cavity 202, as described in further detail herein.

The base plate 204 also defines a lubricant inlet 212, a coolant inlet 222 and a coolant outlet 224 (see FIGS. 6 and 8-9). The lubricant inlet 212 is structured to allow delivery of the lubricant to the internal cavity 202, as described in further detail herein. Furthermore, the coolant inlet 222 is structured to allow delivery of a coolant, and the coolant outlet 224 is structured to allow exiting of a coolant from internal volume of the lubricant filter housing 200, as described in further detail herein. The coolant may include any suitable heat transfer fluid as described before herein with respect to the lubricant filter housing 100.

A plurality of plates 207 are axially positioned within the internal volume of the lubricant filter housing 200 between the top plate 201 and the base plate 204. Expanding further, the plurality of plates 207 are aligned along the axis X-X of the lubricant filter housing 200 as shown in FIG. 10. The plurality of plates 207 may be substantially planar and positioned parallel to the top plate 201 and the base plate 204. The plurality of plates 207 may be made from any suitable material having a high rate of heat transfer, and formed using any suitable process as described in detail with respect to the lubricant filter housing 100.

Each of the plurality of plates 207 defines a plate opening 209 therein (see FIGS. 8-10). Each of the plate openings 209 are axially aligned with the first opening 203 of the top plate 201 such that the first opening 203, the plate openings 209 and a portion of the base plate 204 cooperatively define the internal cavity 202 structured to accept and house the filter element 230. In some embodiments, the plate openings 209 may have a plate opening cross-section which is substantially similar to a first opening cross-section of the first opening 203. In other embodiments, the plate opening cross-section may be different from the first opening cross-section, for example smaller or larger therefrom.

Figure 11:
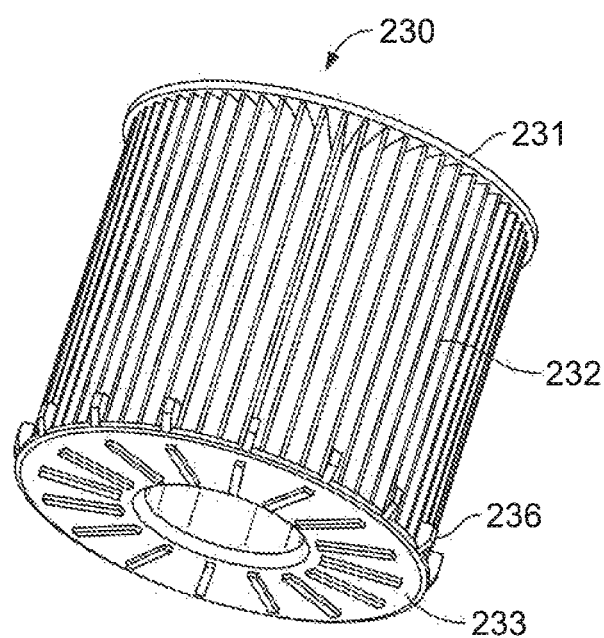
FIG. 11 is a bottom perspective view of a filter element, according to an embodiment.

The filter element 230 may comprise any suitable filter element structured to filter a lubricant flowing into the internal cavity 202. Referring also now to FIG. 11, in particular embodiments, the filter element 230 comprises a filter media 232, a first end cap 231, a second end cap 233, and a center tube 234.

The filter media 232 comprises a porous material having a predetermined pore size and is configured to filter particulate matter from the lubricant (e.g., engine oil) flowing therethrough. The center tube 234 may be included in the filter element 230, for example, the filter media 232 may be wound around the center tube 234 such that the center tube 234 is removable from the internal cavity 202 with the filter element 230. In some embodiments, the filter media 232 may be caged. For example, the filter element 230 may also comprise a porous rigid structure (e.g., a wire mesh) positioned around the filter media 232, and structured to prevent damage to the filter media 232 during insertion and/or removal of the filter element 230 from the internal cavity 202.

In particular embodiments, the center tube 234 may include a plurality of perforations or pores. In other embodiments, the center tube 234 may include slots or openings to allow filtered lubricant to flow through the filter media 232 into the center tube 234.

The first end cap 231 is coupled to a filter media first end of the filter media 232 proximal to the first opening 203. The second end cap 233 is coupled to a filter media second end of the filter media 232 opposite the filter media first end. The first end cap 231 and the second end cap 233 may be formed from any suitable material, for example plastics, metals, rubber, reinforced rubber, polymers etc. The first end cap 231 and the second end cap 233 have a cross-section generally corresponding to the cross-section of the internal cavity 202. The second end cap 233 defines a central through hole positioned concentrically around the center tube 234. The second end cap 233 may protect the second end of the filter media 232 as the filter element 230 is inserted into the internal cavity 202 and/or maintain a shape (e.g., a cylindrical shape) of the filter media 232 so as to facilitate insertion of the filter element 230 into the internal cavity 202.

As described previously, the base plate 204 also defines the lubricant outlet 206 therein, in a portion of the base plate 204 positioned within the internal cavity 202. As shown in FIG. 10, a flange 215 protrudes from a rim of the lubricant outlet 206 into the internal cavity 202. The flange 215 is structured to receive a portion of the center tube 234 of the filter element 230 therearound, so as to facilitate positioning of the filter element 230 into the internal cavity 202. In some embodiments, the flange 215 may be structured such that the cover 250 may not be properly secured to the first opening flange 211 until the filter element 230 is securely positioned within the internal cavity 202. The lubricant outlet 206 is positioned such that when the filter element 230 is positioned within the internal cavity 102, the filtered lubricant passing through the filter media 232 is delivered to the lubricant outlet 206 through the center tube 234, allowing the filtered lubricant to exit the internal cavity 202.

The filter element 230 may be removably positioned in the internal cavity 202. For example, the cover 250 may be selectively disengaged from the first opening flange 211 so as to allow access to, and removal of the filter element 230 (e.g., a used filter element) from the internal cavity 202. A replacement filter element 230 may then be positioned in the internal cavity 202, and the cover 250 repositioned on the first opening flange 211 so as to secure the filter element 230 within the internal cavity 202.

In particular embodiments, the filter element 230 may also include alignment features structured to facilitate insertion of the filter element 230 into the internal cavity 202. For example, FIG. 11 shows a bottom perspective view of the filter element 230. A plurality of tabs 236 are positioned at predetermined locations around the periphery of the second end cap 233. At least a portion of each of the plurality of tabs 236 may overlap the filter media 232 (e.g., inserted between pleats defined in the filter media 232). The plurality of tabs 236 may protrude outwards from the surface of the filter media 232 and serve to guide the insertion of the filter element 230 into the internal cavity 202.

The plurality of plates 207 define a first set of fluid channels 210, and a second set of fluid channels 220 therebetween, as shown in the bottom cross-section views of FIGS. 8-9, and the side cross-section view of FIG. 10. The first set of fluid channels 210 are interposed between the second set of fluid channels 220. In other words, each of the first set of fluid channels 210 is positioned between a pair of the second set of fluid channels 220.

The first set of fluid channels 210 are in fluid communication with the internal cavity 202 and fluidly isolated from the second set of fluid channels 220. The first set of fluid channels 210 are configured to deliver the lubricant (e.g., unfiltered or contaminated lubricant) to the internal cavity 202, thereby communicating the lubricant to the filter element 230 positioned therewithin.

Each of the plurality of plates 207 further defines a lubricant inlet aperture 213 axially aligned with the lubricant inlet 212 defined in the base plate 204. The lubricant inlet aperture 213 is structured to allow delivery of the lubricant from the lubricant inlet 212 to the internal cavity 202 via the first set of fluid channels 210. In some embodiments, a lubricant pump (not shown) such as, for example a positive displacement pump, a rotary pump, etc. may be positioned upstream of the lubricant inlet 212 and in fluid communication therewith (e.g., via a conduit, a tube, a pipe, etc.) so as to pump the lubricant into the first set of fluid channels 210 via the lubricant inlet apertures 213. In other embodiments, the lubricant pump (e.g., a positive displacement pump or a vacuum pump) may be positioned downstream of the lubricant outlet 206, and configured to draw filtered lubricant out of the lubricant outlet 206. The lubricant pump may be included in a lubricant circulation assembly configured to circulate the lubricant through the various parts of the engine and lubricant filter housing 200.

Since the first set of fluid channels 210 are fluidly isolated from the second set of fluid channels 220, the lubricant flows only into the first set of fluid channels 210 from the lubricant inlet 212 in a direction shown by the arrow A in FIG. 9, and therefrom into the internal cavity 202. For example, the portions of each of the second set of fluid channels 220 proximal to the lubricant inlet 212 and the plate openings 209 may be fluidly isolated therefrom via a seal 208 (e.g., an end wall, a seal, a weld, a braze, etc.).

Each of the plurality of plates 207 also define a coolant inlet aperture 223 and a coolant outlet aperture 225. The coolant inlet aperture 223 is axially aligned with the coolant inlet 222 and structured to deliver the coolant to the second set of fluid channels 220 in a direction shown by the arrow C in FIG. 8. The coolant flows through the second set of fluid channels 220, and cools the lubricant flowing through the first set of fluid channels 210. Moreover, the coolant outlet aperture 225 is axially aligned with the coolant outlet 224 and structured to receive the coolant flowing in a direction shown by the arrow D, and deliver the coolant to the coolant outlet 224.

In some embodiments, a coolant pump (not shown) may be positioned upstream of the coolant inlet 222 and in fluid communication therewith (e.g., via a conduit, a tube, a pipe, etc.) so as to pump the coolant into the second set of fluid channels 220. In other embodiments, the coolant pump may be positioned downstream of the coolant outlet 224, and configured to draw the coolant out of the coolant outlet 224.

At least a portion of the first set of fluid channels 210 and the second set of fluid channels 220 is positioned concentrically around the internal cavity 202. Expanding further, each of the plate openings 209 may be defined such that a first portion of each the first set of fluid channels 210 and the second set of fluid channels 220 is substantially planar, and a second portion of each of the first set of fluid channels 210 and the second set of fluid channels 220 loops around the internal cavity 202. The second portion of the first set of fluid channels 210 and the second set of fluid channels 220 enables the lubricant to flow around the internal cavity in a direction shown by the arrow E in FIG. 8. This may allow the coolant and the lubricant to exchange heat through the plurality of plates 207 for a longer period of time, thereby increasing cooling efficiency.

In some embodiments, fluid guides (not shown) may be positioned on each of the plurality of plates 207 in order to facilitate delivery of the coolant and lubricant to the portion of the first set of fluid channels 210 and the second set of fluid channels 220 positioned concentrically around the internal cavity 202. Such fluid guides may include, but are not limited to vanes, channels, protrusions, internal sidewalls, etc.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A lubricant filter housing, comprising:
a top plate, the top plate defining a first opening therein;
a base plate positioned opposite the top plate, the base plate defining:

a lubricant outlet distal to the first opening and axially aligned therewith,
a lubricant inlet,
a coolant inlet, and
a coolant outlet;
at least one sidewall, the at least one sidewall, the top plate, and the base plate cooperatively defining an internal volume;
a plurality of plates axially positioned in the internal volume between the top plate and the base plate, each of the plurality of plates defining a plate opening axially aligned with the first opening such that the first opening, the plate openings and a portion of the base plate cooperatively define an internal cavity structured to accept and house a filter element; and
a flange protruding from a rim of the lubricant outlet, the flange protruding within the internal cavity, the flange structured to receive a portion of the filter element therearound so as to facilitate positioning of the filter element into the internal cavity,
wherein the plurality of plates define a first set of fluid channels and a second set of fluid channels therebetween, the first set of fluid channels interposed between the second set of fluid channels, the first set of fluid channels in fluid communication with the internal cavity and fluidly isolated from the second set of fluid channels, and the second set of fluid channels fluidly isolated from the first set of fluid channels and the internal cavity,
wherein each of the lubricant inlet, the coolant inlet, and the coolant outlet are located at an end of the lubricant filter housing that is opposite the internal cavity, the lubricant inlet, the coolant inlet, and the coolant outlet being axially aligned along a plane that is perpendicular to a longitudinal axis of the lubricant filter housing.

2. The lubricant filter housing of claim 1, wherein each of the plurality of plates further defines a lubricant inlet aperture axially aligned with the lubricant inlet and structured to allow delivery of a lubricant from the lubricant inlet to the internal cavity via the first set of fluid channels.

3. The lubricant filter housing of claim 2, further comprising:
a coolant inlet aperture axially aligned with the coolant inlet and structured to allow delivery of a coolant to the second set of fluid channels so as to cool the lubricant flowing through the first set of fluid channels; and
a coolant outlet aperture axially aligned with the coolant outlet and structured to allow exiting of the coolant from the coolant outlet.

4. The lubricant filter housing of claim 1, wherein at least a portion of the first set of fluid channels and the second set of fluid channels is positioned concentrically around the internal cavity.

5. The lubricant filter housing of claim 1, further comprising:
a cover, at least a portion of the cover structured to be positioned securely within the first opening.

6. The lubricant filter housing of claim 5, wherein the cover comprises a nut protruding from a surface thereof away from the internal cavity.

7. The lubricant filter housing of claim 5, further comprising a filter bypass valve, and wherein the cover further comprises a receptacle extending from an inner surface of the cover towards the internal cavity, at least a portion of the filter bypass valve positioned within the receptacle.

8. The lubricant filter housing of claim 5, further comprising:
a first opening flange extending from a rim of the first opening away from the internal cavity, the first opening flange structured to engage and secure at least a portion of the cover.

9. A filter assembly, comprising:
a lubricant filter housing, comprising:
a top plate, the top plate defining a first opening therein;
a base plate positioned opposite the top plate, the base plate defining:
a lubricant outlet distal to the first opening and axially aligned therewith,
a lubricant inlet,
a coolant inlet, and
a coolant outlet;
at least one sidewall, the at least one sidewall, the top plate, and the base plate cooperatively defining an internal volume; and
a plurality of plates axially positioned in the internal volume between the top plate and the base plate, each of the plurality of plates defining a plate opening axially aligned with the first opening such that the first opening, the plate openings and a portion of the base plate cooperatively define an internal cavity, the plurality of plates defining a first set of fluid channels and a second set of fluid channels therebetween, the first set of fluid channels interposed between the second set of fluid channels, the first set of fluid channels in fluid communication with the internal cavity and fluidly isolated from the second set of fluid channels, and the second set of fluid channels fluidly isolated from the first set of fluid channels and the internal cavity;
a filter element positioned in the internal volume; and
a flange protruding from a rim of the lubricant outlet, the flange protruding within the internal cavity, the flange structured to receive a portion of the filter element therearound so as to facilitate positioning of the filter element into the internal cavity,
wherein each of the lubricant inlet, the coolant inlet, and the coolant outlet are located at an end of the lubricant filter housing that is opposite the internal cavity, the lubricant inlet, the coolant inlet, and the coolant outlet being axially aligned along a plane that is perpendicular to a longitudinal axis of the lubricant filter housing.

10. The filter assembly of claim 9, wherein each of the plurality of plates further defines a lubricant inlet aperture axially aligned with the lubricant inlet and structured to allow delivery of a lubricant from the lubricant inlet to the internal cavity via the first set of fluid channels.

11. The filter assembly of claim 10, further comprising:
a coolant inlet aperture axially aligned with the coolant inlet and structured to allow delivery of a coolant to the second set of fluid channels so as to cool the lubricant flowing through the first set of fluid channels; and
a coolant outlet aperture axially aligned with the coolant outlet and structured to allow exit of the coolant from the coolant outlet.

12. The filter assembly of claim 9, wherein at least a portion of the first set of fluid channels and the second set of fluid channels is positioned concentrically around the internal cavity.

13. The filter assembly of claim 9, further comprising:
a cover, at least a portion of the cover structured to be positioned securely within the first opening.

14. The filter assembly of claim 13, wherein the cover comprises a nut protruding from a surface thereof away from the internal cavity.

15. The filter assembly of claim 13, further comprising a filter bypass valve, and wherein the cover further comprises a receptacle extending from an inner surface of the cover towards the internal cavity, at least a portion of the filter bypass valve positioned within the receptacle.

16. The filter assembly of claim 13, further comprising:
   a first opening flange extending from a rim of the first opening away from the internal cavity, the first opening flange structured to engage and secure at least a portion of the cover.

\* \* \* \* \*